US012665248B2

(12) United States Patent　　　　　(10) Patent No.:　US 12,665,248 B2
Kraus et al.　　　　　　　　　　　　(45) Date of Patent:　Jun. 23, 2026

(54) BATTERY BOX FOR MARINE VESSEL

(71) Applicant: Brunswick Corporation, Mettawa, IL (US)

(72) Inventors: Jeremy J. Kraus, Mt. Calvary, WI (US); Aaron J. Novak, North Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 911 days.

(21) Appl. No.: 18/049,823

(22) Filed: Oct. 26, 2022

(65) Prior Publication Data

US 2024/0145832 A1　　May 2, 2024

(51) Int. Cl.
H01M 50/202　　(2021.01)
H01M 10/46　　(2006.01)
(Continued)

(52) U.S. Cl.
CPC ....... *H01M 50/202* (2021.01); *H01M 50/251* (2021.01); *H01M 50/296* (2021.01); *H01M 10/46* (2013.01); *H01M 50/244* (2021.01); *H01M 50/249* (2021.01); *H01M 2220/20* (2013.01)

(58) Field of Classification Search
CPC ............. H01M 50/202; H01M 50/251; H01M 50/296; H01M 50/244; H01M 50/249; H01M 50/204; H01M 50/207; H01M 50/271; H01M 50/284; H01M 50/287; H01M 50/289; H01M 50/291; H01M 50/298; H01M 50/584; H01M 2220/20; H01M 10/46; H01M 10/613; H01M 10/6563; H01M 10/0413; H01M 10/625; H01M 10/6235

See application file for complete search history.

(56) References Cited

U.S. PATENT DOCUMENTS 6,967,463 B1 * 11/2005 Gordon ................. H02J 7/0019
　　　　　　　　　　　　　　　　　　　　　320/103
9,077,053 B2　7/2015 Schneider et al.
(Continued)

FOREIGN PATENT DOCUMENTS

EP　　　　2280436　　　*　2/2011
JP　　　H0911759 A　　　　1/1997
WO　　2019017847 A1　　1/2019

OTHER PUBLICATIONS

Extended European Search Report in European Patent Application No. 23204494.1, dated Apr. 8, 2024, 8 pages.
(Continued)

*Primary Examiner* — Matthew W Van Oudenaren
(74) *Attorney, Agent, or Firm* — Andrus Intellectual Property Law, LLP

(57) ABSTRACT

A battery box includes a housing defining an interior of the battery box, a ledge projecting into the interior of the battery box, and a box electrical connector installed on the ledge. The interior of the battery box is configured to receive a battery therein. The battery has a projecting portion sized and shaped to abut the ledge when the battery is installed in the battery box. A battery electrical connector on the projecting portion of the battery mates with the box electrical connector upon installation of the battery in the battery box.

19 Claims, 8 Drawing Sheets

(51) Int. Cl.
　　*H01M 50/244* 　　(2021.01)
　　*H01M 50/249* 　　(2021.01)
　　*H01M 50/251* 　　(2021.01)
　　*H01M 50/296* 　　(2021.01)

(56)　　　　　References Cited

U.S. PATENT DOCUMENTS

| | | | |
|---|---|---|---|
| 9,705,161 | B2 | 7/2017 | Nishihara et al. |
| 10,044,197 | B2 | 8/2018 | Fry et al. |
| 10,892,624 | B2 | 1/2021 | Mergener et al. |
| 11,095,138 | B2 | 8/2021 | Schneider et al. |
| 2005/0161276 | A1* | 7/2005 | Jones ..................... B62K 5/025 |
| | | | 180/68.5 |
| 2006/0113956 | A1 | 6/2006 | Bublitz et al. |
| 2012/0189886 | A1* | 7/2012 | Tsumaki ........... H01M 10/4207 |
| | | | 429/87 |
| 2022/0102825 | A1 | 3/2022 | Downey |
| 2022/0181892 | A1 | 6/2022 | Tian et al. |

OTHER PUBLICATIONS

Collins et al., "Marine Drives Having Accessible Cowling Interior and Protective Cover," U.S. Appl. No. 17/585,259, filed Jan. 26, 2022 (specification, claims, and drawings only).

Jaszewski et al., "Marine Drives Having Supporting Frame and Cowling," U.S. Appl. No. 17/585,214, filed Jan. 26, 2022 (specification, claims, and drawings only).

Jaszewski et al., "Marine Drives Having Accessible Cowling Interior and Battery," U.S. Appl. No. 17/585,285, filed Jan. 26, 2022 (specification, claims, and drawings only).

Seta et al., "Battery," U.S. Appl. No. 29/823,701, filed Jan. 19, 2022 (specification and drawings only).

Downey, Kevin T., "Marine Battery Box and Cover Therefor," U.S. Appl. No. 17/181,522, filed Feb. 22, 2021 (specification, claims, and drawings only).

Downey, Kevin T., "Battery Box," U.S. Appl. No. 17/197,619, filed Mar. 10, 2021 (specification, claims, and drawings only).

Downey, Kevin T., "Battery Box," U.S. Appl. No. 17/471,996, filed Sep. 10, 2021 (specification, claims, and drawings only).

* cited by examiner

SHORE POWER

BATTERY BOX FOR MARINE VESSEL

FIELD

The present disclosure relates to batteries and boxes for storing and/or charging batteries.

BACKGROUND

U.S. patent application Ser. No. 17/181,522, filed Feb. 22, 2021, discloses a container for a marine battery including a lower portion for supporting the marine battery and a cover portion over the lower portion. The cover portion and lower portion together enclose an interior space configured to hold the battery. The cover portion has a middle section and two end sections on either side of the middle section. At least one of the end sections has an access door that is movable independently of the middle section to provide access to the interior space, while the middle section remains stationary with respect to the lower portion.

U.S. patent application Ser. No. 17/197,619, filed Mar. 10, 2021, discloses a battery box having front and rear walls and first and second sidewalls defining an interior of the battery box. A first guideway is provided on a surface of the first sidewall that faces the interior. A second guideway is provided on a surface of the second sidewall that faces the interior. The first and second guideways extend in the height direction. A first spacer is configured to move in the height direction along the first guideway, and a second spacer is configured to move in the height direction along the second guideway. The first and second guideways and/or the first and second spacers have an angled surface so that as the first and second spacers are moved downwardly in the height direction along the respective first and second guideways, a gap defined in the length direction between the first and second spacers is narrowed.

U.S. patent application Ser. No. 17/471,996, filed Sep. 10, 2021, discloses a battery box including a main housing and a cover that together define an interior of the battery box and a vent in at least one of the main housing and the cover. The vent provides fluid communication between the interior of the battery box and an atmosphere surrounding the battery box. An upper baffle is positioned in the interior of the battery box behind the vent. The upper baffle is configured to direct any liquid that enters the vent downwardly. A drain opening in the main housing allows liquid that enters through the vent to exit the main housing. A lower baffle positioned proximate the drain opening prevents liquid from entering the interior of the battery box through the drain opening.

U.S. patent application Ser. No. 29/823,701, filed Jan. 19, 2022, discloses an ornamental design for a battery.

U.S. patent application Ser. No. 17/585,259, filed Jan. 26, 2022, discloses a marine drive for propelling a marine vessel. The marine drive has a propulsor configured to generate a thrust force in a body of water, an electric motor that powers the propulsor, a battery having a battery port for outputting battery power, a supporting frame that supports the marine drive relative to marine vessel, the supporting frame having a frame interior that retains the battery, and a motor port in the frame interior, wherein inserting the battery into the frame interior engages the battery port with the motor port so that the battery provides electric power to the electric motor. A removable cover is provided on the motor port.

U.S. patent application Ser. No. 17/585,285, filed Jan. 26, 2022, discloses a marine drive for propelling a marine vessel. The marine drive has a propulsor configured to generate a thrust force in a body of water, an electric motor which powers the propulsor, a battery having a battery port for outputting battery power, a supporting frame which supports the marine drive relative to marine vessel, the supporting frame having a frame interior which retains the batter, and a cowling on the supporting frame. The cowling has a first cowl portion and a second cowl portion which is movable relative to the first cowl portion into a closed position enclosing the supporting frame and the battery in a cowling interior and alternately into an open position providing access to the cowling interior enabling insertion and removal of the battery.

The above patent applications are hereby incorporated herein by reference herein, in their entireties.

SUMMARY

This Summary is provided to introduce a selection of concepts that are further described herein below in the Detailed Description. This Summary is not intended to identify key or essential features of the claimed subject matter, nor is it intended to be used as an aid in limiting scope of the claimed subject matter.

According to one example of the present disclosure, a battery box comprises a housing defining an interior of the battery box, a ledge projecting into the interior of the battery box, and a box electrical connector installed on the ledge. The interior of the battery box is configured to receive a battery therein. The battery has a projecting portion sized and shaped to abut the ledge when the battery is installed in the battery box. A battery electrical connector on the projecting portion of the battery is configured to mate with the box electrical connector upon installation of the battery in the battery box.

According to one example, the battery box further comprises a power output connector coupled to the box electrical connector. The power output connector is configured to receive power from the battery when the battery is installed in the battery box and to output power to a peripheral device. The power output connector may be installed on an exterior of the housing.

According to one example, the battery box further comprises a power input connector coupled to the box electrical connector. The power input connector is configured to receive power from an external power source and to output power to the battery when the battery is installed in the battery box. The power input connector may be installed on an exterior of the housing.

According to another example of the present disclosure, a battery box for installation on a marine vessel comprises a housing configured to be mounted to the marine vessel. The housing defines an interior of the battery box and a ledge projects into the interior of the battery box. A box electrical connector is installed on the ledge. A power output connector is coupled to the box electrical connector. The interior of the battery box is configured to receive a battery therein. The battery has a projecting portion sized and shaped to abut the ledge when the battery is installed in the battery box. A battery electrical connector on the projecting portion of the battery is configured to mate with the box electrical connector upon installation of the battery in the battery box. The power output connector is configured to receive power from the battery when the battery is installed in the battery box and to output power to a peripheral device on the marine vessel.

According to one example, the peripheral device is a trolling motor.

According to one example, the power output connector is installed on an exterior of the housing.

According to one example, the battery box further comprises a power input connector coupled to the box electrical connector. The power input connector is configured to receive power from an external power source and to output power to the battery when the battery is installed in the battery box. The power input connector may be installed on an exterior of the housing.

According to either example, the battery box further comprises a fan configured to provide air from an area surrounding the battery box to the interior of the battery box. The fan may be installed on a wall of the housing below the ledge.

According to either example, the battery box further comprises an additional box electrical connector installed on the ledge. The interior of the battery box is configured to receive the battery and an additional battery simultaneously. A battery electrical connector on a projecting portion of the additional battery is configured to mate with the additional box electrical connector upon installation of the additional battery in the battery box.

According to either example, the battery is removable from the battery box.

According to either example, the battery box further comprises a slot or track in the interior of the battery box. The slot or track is configured to mate with a corresponding track or slot on the battery to guide installation of the battery within the battery box.

BRIEF DESCRIPTION OF THE DRAWINGS

Examples of batteries, battery boxes, and peripheral devices are described with reference to the following drawing figures. The same numbers are used throughout to reference like features and components.

DETAILED DESCRIPTION

Figure 1:
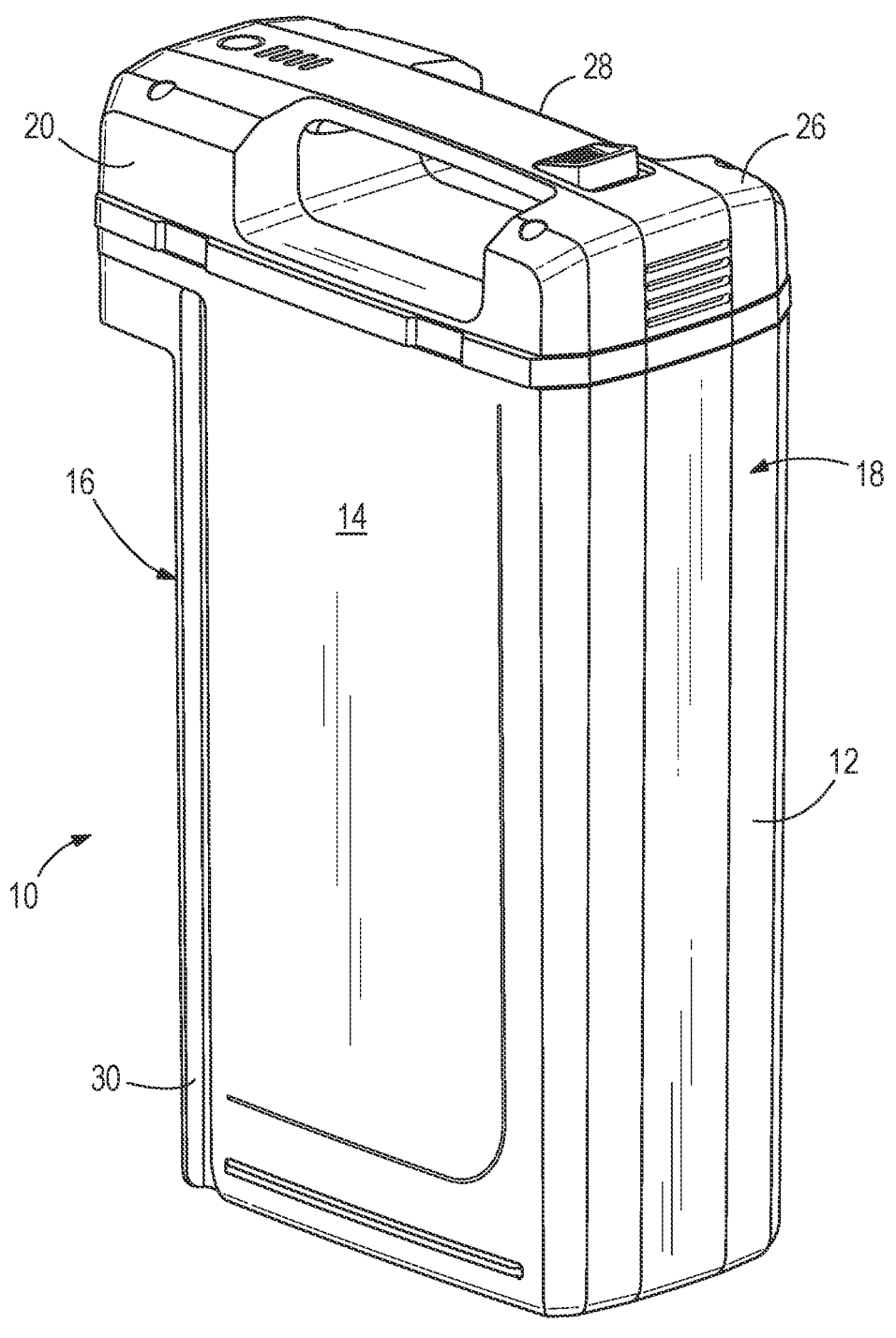
FIG. 1 is a rear perspective view of a battery.

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "linked," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings and can include electrical couplings.

As used herein, unless otherwise limited or defined, discussion of particular directions is provided by example only, with regard to particular embodiments or relevant illustrations. For example, discussion of "top," "bottom," "front," "back," "left," "right," "lateral" or "longitudinal" features is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally, use of the words "first," "second", "third," etc. is not intended to connote priority or importance, but merely to distinguish one of several similar elements from another.

Any of the elements shown or described as being male or female elements may instead be of the opposite gender, it being understood that the second element with which the first element mates would necessarily also have the opposite gender from that shown or described.

Figures 2, 3:
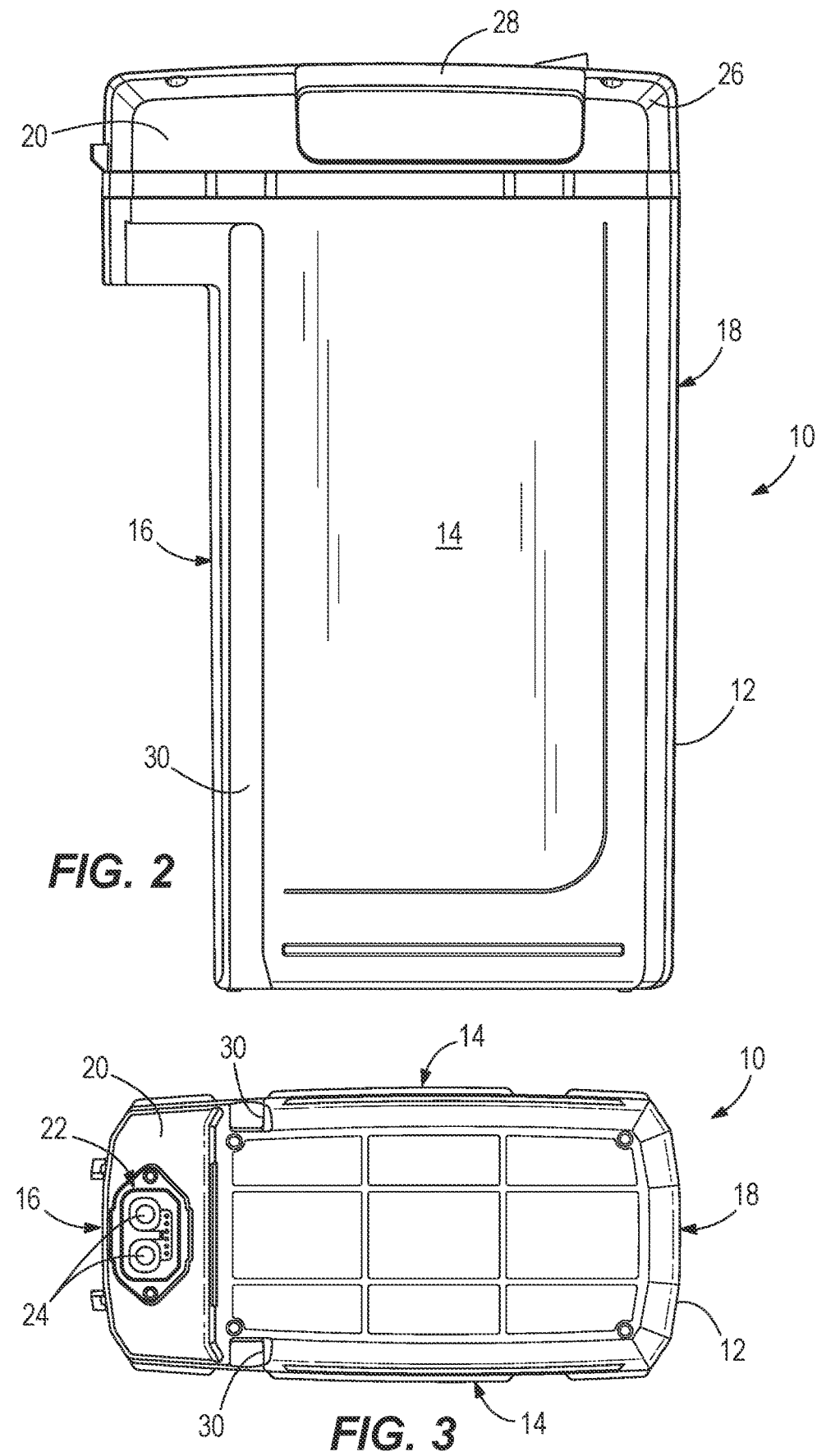
FIG. 2 is a side view of the battery.
FIG. 3 is a bottom view of the battery.

FIGS. 1-3 show perspective, side, and bottom views, respectively, of a battery 10. The battery 10 is rechargeable and can vary in type, but in one example is a lithium ion battery. In some examples, the battery is a 12V, 24V, 36V, or 48V battery, although the battery 10 could have another voltage. In one example, the battery 10 has a power rating of 1 kW. In the illustrated example, the battery 10 has a box-shaped body 12 having opposing side surfaces 14 and opposing front and rear surfaces 16, 18. A projecting portion 20 extends forwardly from the top of the front surface 16 and has a battery port 22 including a battery electrical connector 24 (FIG. 3) recessed in the underside thereof. The battery 10 also has a top cap 26 located on top of the battery body 12 and projecting portion 20. The top cap 26 has a handle 28, which conveniently enables grasping and lifting of the battery 10. Elongated slots 30 extend along the battery body 12, in particular, along the opposing side surfaces 14 adjacent the front surface 16 of the battery 10.

Figure 4:
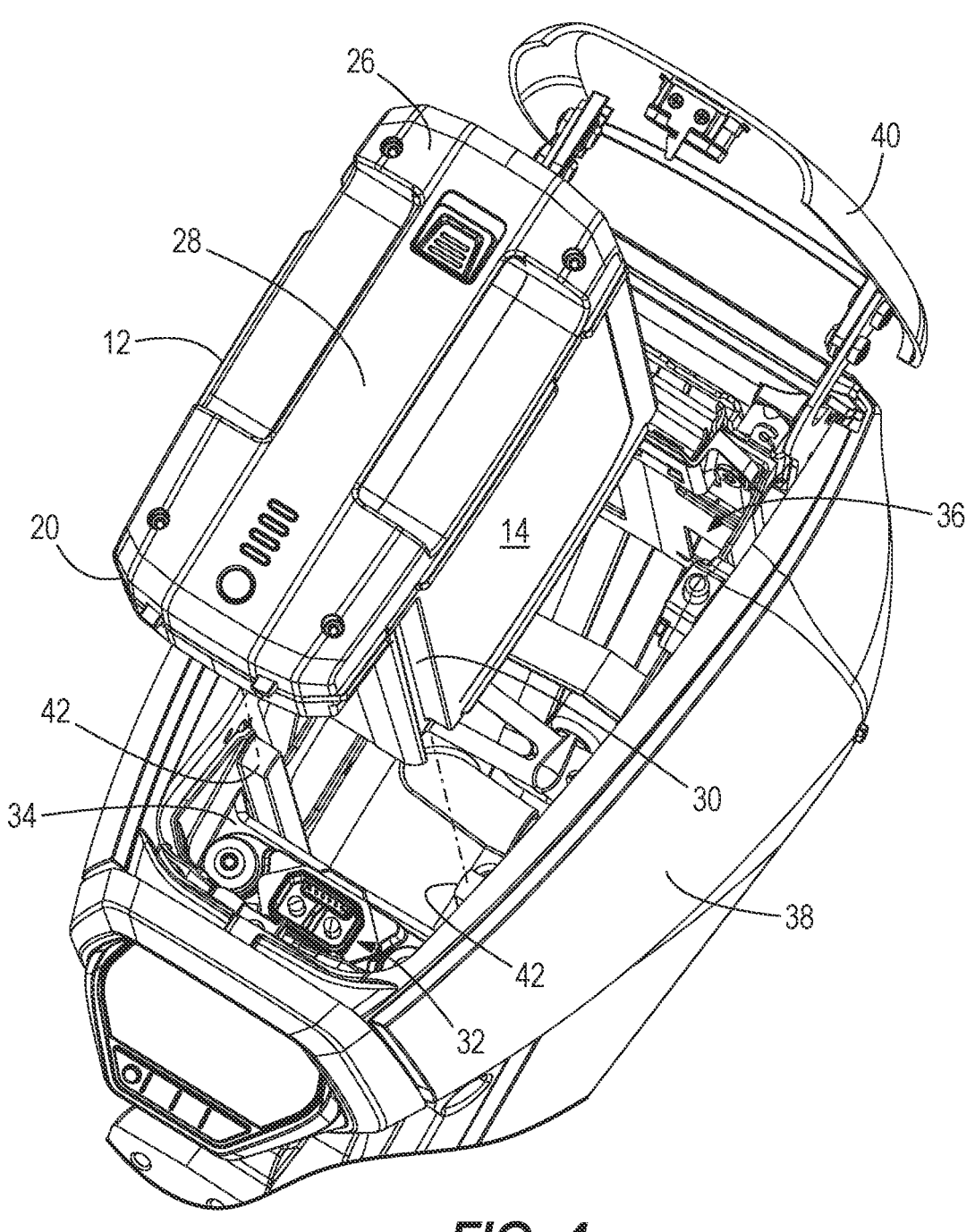
FIG. 4 is a top perspective view of the battery as it is being installed in an electric outboard motor.
Figures 5, 6:
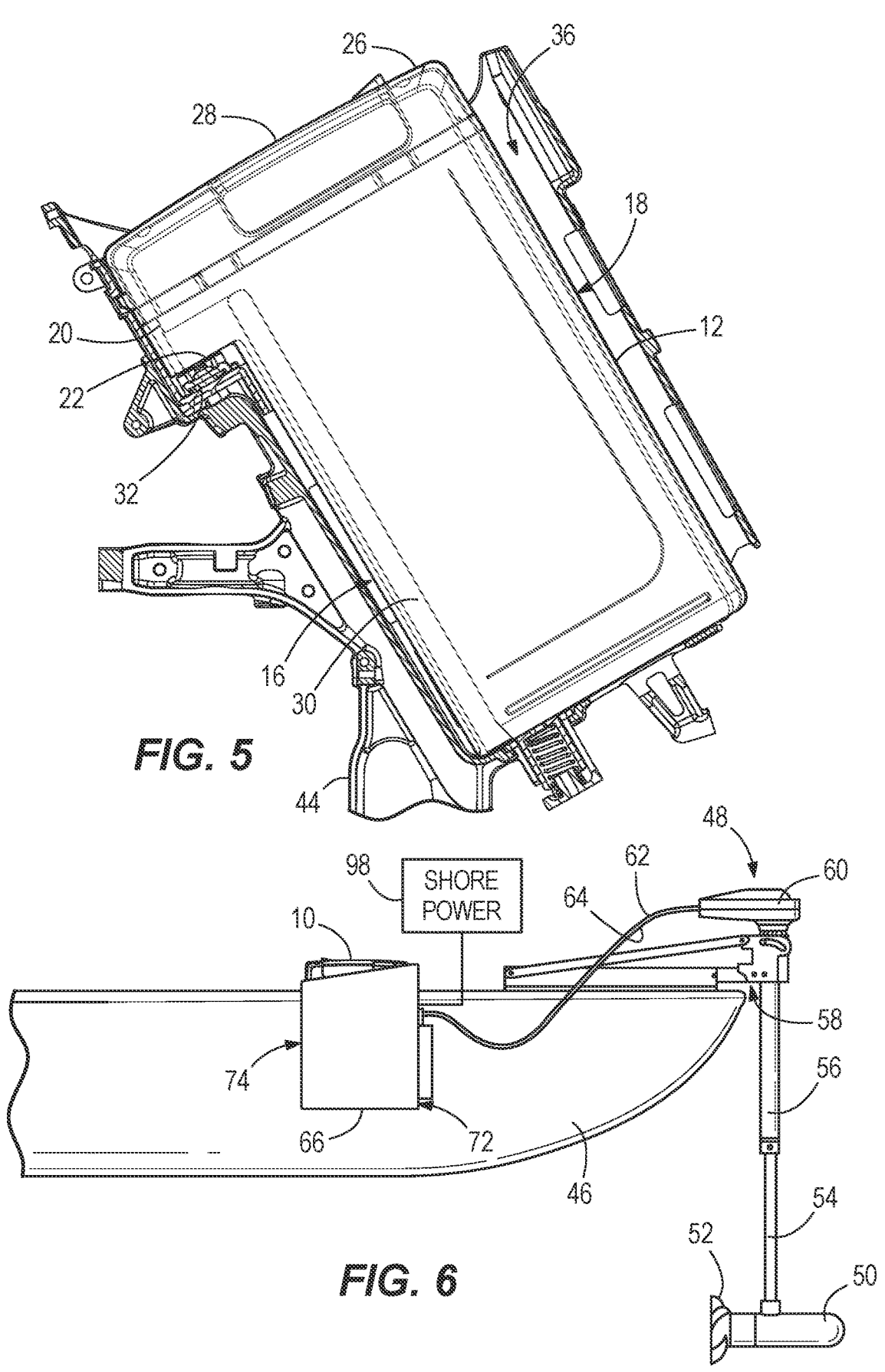
FIG. 5 is a side cross-sectional view of the battery fully installed in the electric outboard motor.
FIG. 6 is a schematic of a marine vessel with a trolling motor and a battery box installed thereon.

In one example, the battery 10 is specifically designed for use within a marine propulsion device such as an electric outboard motor. FIG. 4 shows a top perspective view of a portion of an electric outboard motor while the battery 10 is being installed therein, while FIG. 5 shows a cross-sectional view of a portion of the electric outboard motor after the battery 10 has been installed therein. As noted hereinabove, the battery port 22 is located on the undersurface of the projecting portion 20 of the battery 10 and is configured to output power from the battery 10. A corresponding motor port 32 is located on an internal ledge portion 34 of a supporting frame 36 installed within a cowl 38 of the electric outboard motor. The battery 10 and supporting frame 36 are configured such that inserting the battery 10 into the frame 36 automatically engages the battery port 22 with the motor port 32 so that the battery 10 is able to provide electrical power to the electric motor that powers the marine propulsion device. With the lid 40 in an open position, the user grasps the battery handle 28 and lowers the battery 10 into the frame 36 while aligning the elongated slots 30 on the battery body 12 with elongated tracks 42 on the frame 36 or a subunit thereof. As the battery 10 is lowered into the frame 36, the slots 30 slide downwardly along the tracks 42 as the bottom of the projecting portion 20 is brought closer to the internal ledge portion 34 and until the battery port 22 is automatically brought into alignment with and then electrical mating contact with the motor port 32. As will be understood by one having ordinary skill in the art, the battery port 22 and motor port 32 have profiles that correspond to each other such that these components mate together and electrical contacts (e.g., 24) within each port 22, 32 contact each other when the battery and motor ports 22, 32 are physically joined, thus enabling electricity from the battery 10 to be provided to the electric motor of the marine propulsion device. Electrical wires (not shown) connect the motor port 32 to the electric motor, optionally via other electrical auxiliary components, as would be known to one having ordinary skill in the art. The electrical wires extend downwardly through a support leg 44 of the supporting frame 36 and then into a lower unit of the electric outboard motor for connection to the electric motor therein via a conventional electrical input, which may include a printed circuit board.

Further details of the battery 10 and the electric outboard motor are provided in U.S. patent application Ser. Nos. 17/585,259 and 17/585,285, both filed Jan. 26, 2022, incorporated by reference herein.

In addition to (or instead of) an electric outboard motor or an internal combustion engine-powered marine propulsion device, some boats are also equipped with a trolling motor for operation at slower speeds. One example of a marine vessel 46 with a trolling motor 48 installed thereon is shown in FIG. 6. As shown, the trolling motor 48 is a bow-mounted system; however, the trolling motor 48 could be provided elsewhere on the marine vessel 46. The trolling motor 48 includes a lower unit 50 supporting a propeller 52 rotatably driven by an electric motor housed within the lower unit 50. The lower unit 50 is connected to a steering shaft 54 rotatably received in a fixed shaft 56, which is mounted to the marine vessel 46 by way of a mount 58. The steering shaft 54 is rotationally fixed with respect to the lower unit 50, and can be rotated within the fixed shaft 56 so as to control the orientation (and direction of thrust) generated by the propeller 52. The trolling motor 48 further includes a head unit 60 mounted at the top of the fixed shaft 56. A pair of cables 62, 64 extends from within the head unit 60 to a power source for supplying electrical power to, for example, a controller in the head unit 60 and the electric motor in the lower unit 50. In prior art arrangements, the source of power was one, two, or three lead acid batteries, depending on the voltage of the trolling motor 48. The batteries would be strapped down in a battery box and the size and quantity of the batteries would take up a large footprint in the marine vessel 46 and add significant weight. Furthermore, an onboard charger (which takes up more space) is often required to charge such lead acid batteries, as they are awkward to remove from the battery box due to the need to unhook any jumper cables connecting the batteries to each other and unstrap the batteries from the battery box. However, in the present disclosure, the power source for the trolling motor 48 is instead one or more batteries (such as the same battery 10 shown in FIGS. 1-3) located in a battery box 66 installed on the marine vessel 46.

The present inventors realized that the lithium ion battery 10 meant for use in the electric outboard motor shown in FIG. 4 could be used for other things, such as, but not limited to, powering an electric trolling motor. Seeing as an electric trolling motor is typically not designed to hold a battery in its head unit 60, and seeing as the battery 10 is designed with a specific battery port 22 that cannot be directly connected to cables 62, 64 connected to the trolling motor 48, the present inventors realized that a battery box 66 could be utilized to hold the battery 10 and facilitate use of the battery 10 to power the electric trolling motor 48. Details of the battery box 66, as well as other uses therefor, are described herein below.

Figure 7:
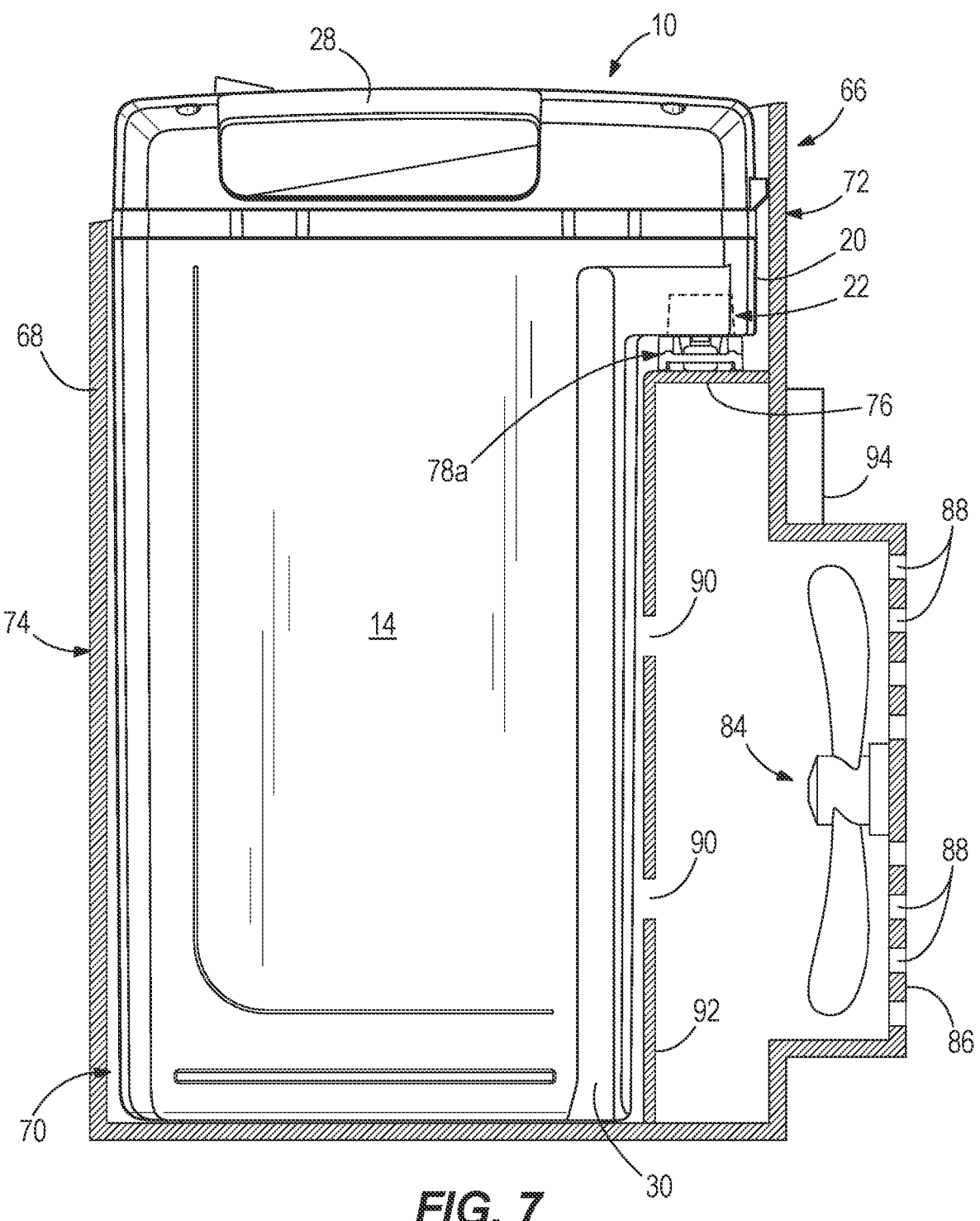
FIG. 7 is a side cross-sectional view of the battery box shown in FIG. 6.
Figure 8:
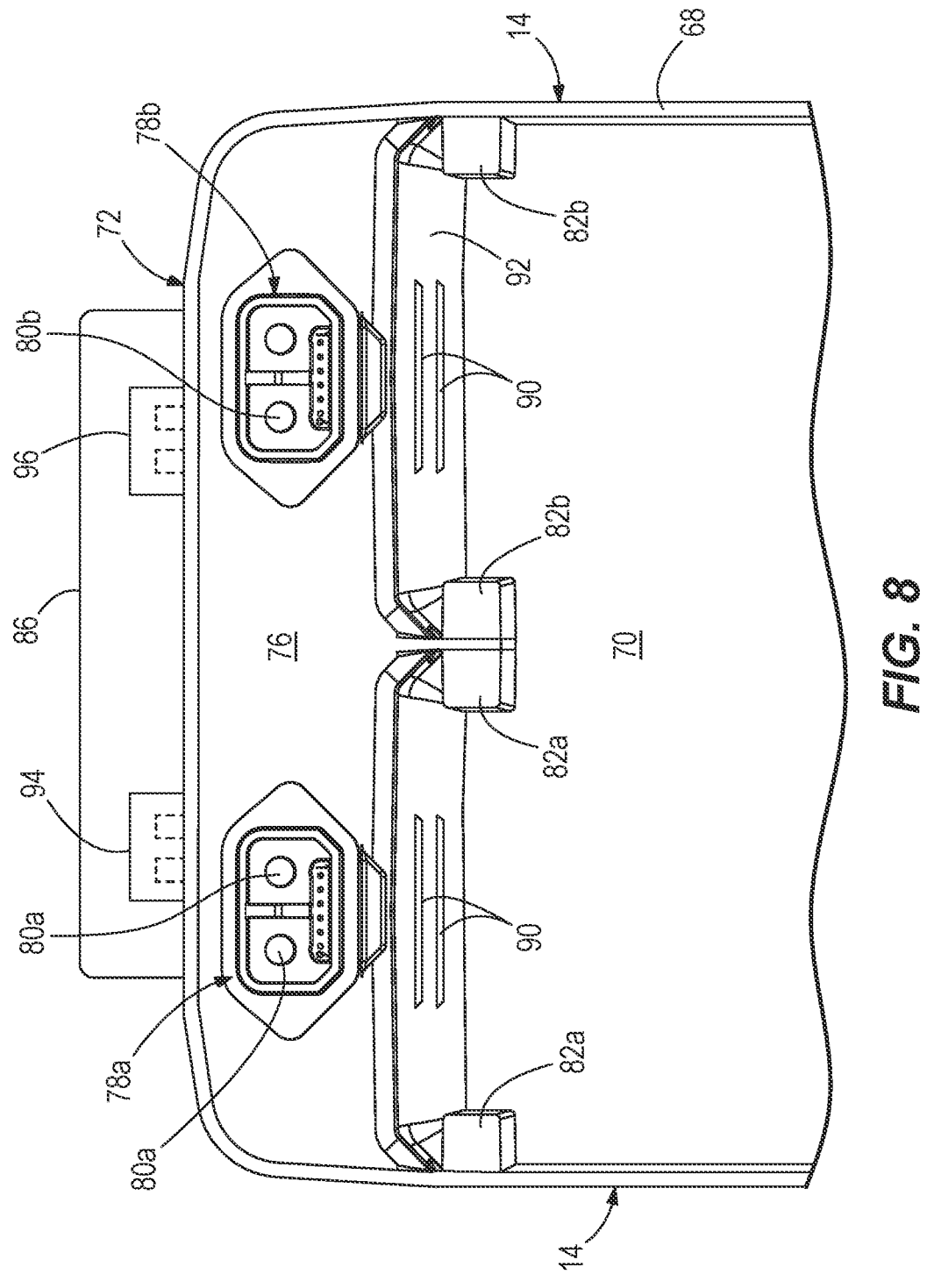
FIG. 8 is a top view of a portion of the battery box.
Figure 9:
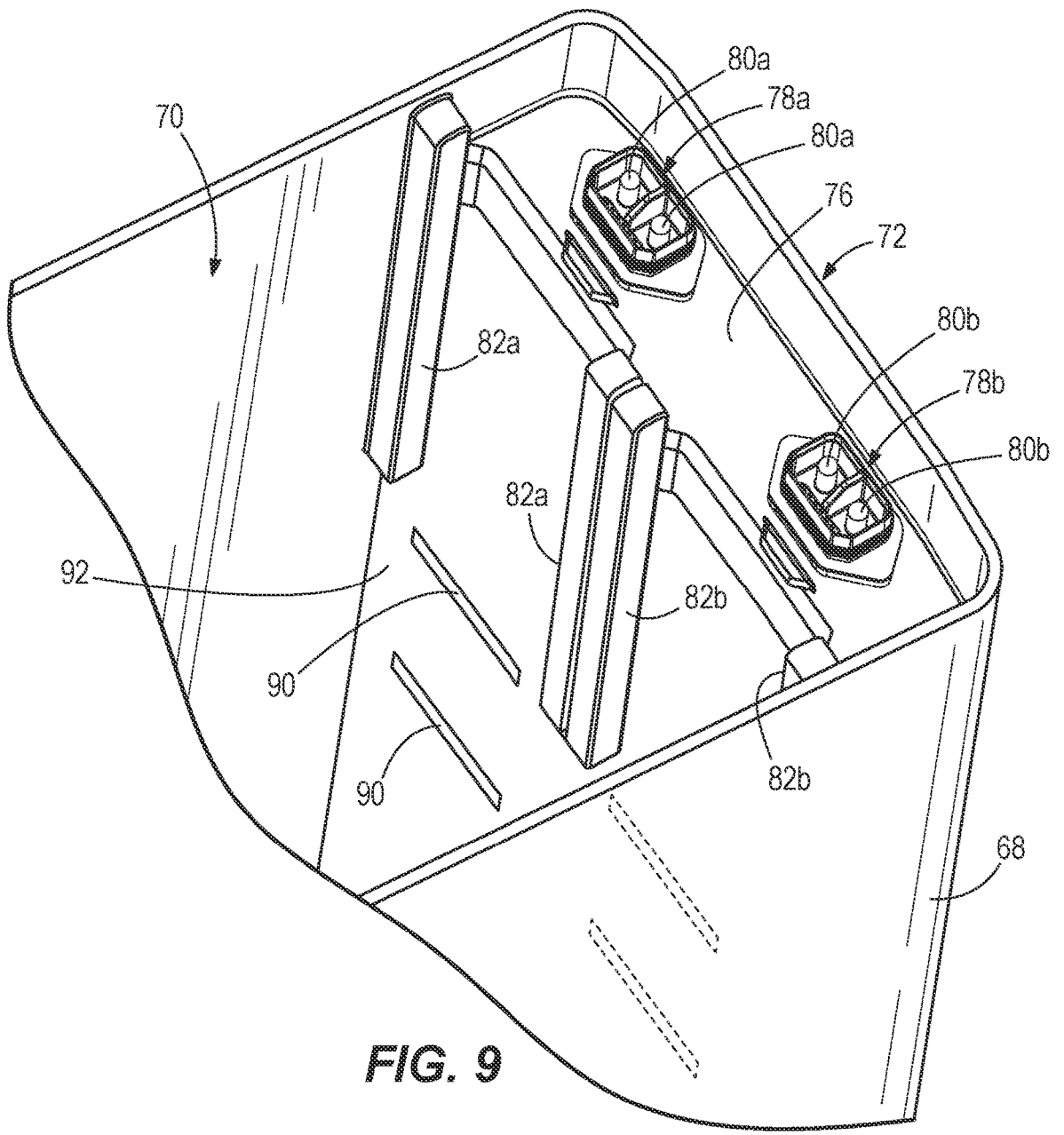
FIG. 9 is a top perspective view of a portion of the battery box.

FIGS. 7-9 show various aspects of one example of the battery box 66 according to the present disclosure. FIG. 7 is a side cross-sectional view taken parallel to the plane of FIG. 6, with the battery 10 installed in the battery box 66. FIG. 8 is a top view looking down into the empty battery box 66 and FIG. 9 is a perspective view of the empty battery box 66. The battery box 66 comprises a housing 68 defining an interior 70 of the battery box 66. The housing 68 is generally rectangular, and may have one side that is shorter than the other, as shown herein, such that the top of the housing 68 is slanted from front 72 to back 74 so as to allow for easier installation and removal of the battery 10 therein. In other examples, the housing 68 has a height that does not vary from front to back. A ledge 76 projects into the interior 70 of the battery box 66. A box electrical connector 80a is installed on the ledge 76. Here, a box connector port 78a is provided on the ledge 76, which box connector port 78a includes a pair of box electrical connectors 80a. The box connector port 78a and box electrical connectors 80a project upwardly from the ledge 76, but in other examples could be recessed within the ledge 76. Each box electrical connector 80a is electrically connected to electrical wiring within the housing 68 as will be described hereinbelow. As shown in FIG. 7, the interior 70 of the battery box 66 is configured to receive a battery 10 therein. As noted hereinabove, the battery 10 has a projecting portion 20, which projecting portion 20 is sized and shaped to abut the ledge 76 when the battery 10 is installed in the battery box 66. Such abutment is simultaneous with the battery port 22 (shown in phantom) being brought into alignment and electrical mating contact with the box connector port 78a. Thus, each battery electrical connector 24 (FIG. 3) on the projecting portion 20 of the battery 10 is configured to mate with a corresponding box electrical connector 80a upon installation of the battery 10 in the battery box 66.

Although the battery box 66 could be configured to hold just one battery 10, in some instances it is beneficial to configure the battery box 66 to hold two, three, or more batteries simultaneously. Thus, as shown in FIGS. 8 and 9, the battery box 66 further comprises an additional box electrical connector 80b installed on the ledge 76 as part of box connector port 78b. The interior 70 of the battery box 66 is configured to receive the battery 10 and an additional battery 10 simultaneously and a battery electrical connector 24 on a projecting portion 20 of the additional battery 10 is configured to mate with the additional box electrical connector 80b upon installation of the additional battery 10 in the battery box 66. The additional battery 10 is identical to the battery 10 shown and described with respect to FIGS. 1-3 and is installed in the same manner as described with respect to FIG. 7.

Moreover, the battery box 66 further comprises a slot or track in the interior 70 of the battery box 66 and the slot or track is configured to mate with a corresponding track or slot on the battery 10 to guide installation of the battery 10 within the battery box 66. For example, the battery box 66 shown in FIGS. 8 and 9 has a first pair of tracks 82*a* for receipt of the slots 30 on either side surface 14 of a first battery 10 and a second pair of tracks 82*b* for receipt of the slots 30 on either side surface 14 of a second battery 10. The tracks 82*a*, 82*b* are formed on an interior wall 92 and (in the case of the two laterally most outward tracks) on the interior of the side surfaces 14 of the housing 68. The tracks 82*a*, 82*b* do not need to reach to the bottom of the interior 70 of the battery box 66, but do reach far enough down into the interior 70 to guide installation of the batteries 10 therein and ensure mating between the battery ports 22 and the box connector ports 78*a*, 78*b*. Although no interior wall is provided to separate the two batteries from one another, a wall could be provided in other examples, between the two centrally located tracks 82*a* and 82*b*.

FIGS. 7 and 8 show a further aspect of the battery box 66, that is, a fan 84 configured to provide air from an area surrounding the battery box 66 to the interior 70 of the battery box 66. In the present example, the fan 84 is installed on a wall 86 of the housing 68 below the ledge 76; however, the fan 84 could be located elsewhere. The hub of the fan 84 can be attached to the wall 86 and vents 88 through the wall 86 provide air from the area surrounding the battery box 66 to the fan 84. Further vents 90 through the interior wall 92 of the battery box 66 provide air into the interior 70 of the battery box 66. In other examples, there is no interior wall 92 between the fan 84 and the remainder of the interior 70 of the battery box 66. In other examples, electrical wiring internal to the housing 68 can be routed in the space between the fan 84 and the interior wall 92, and a further vented wall can be provided between the fan 84 and this interior space. This electrical wiring can provide connection between the box electrical connectors 80*a*, 80*b* and a power input connector and/or a power output connector, as will be described below.

As best shown in FIG. 8, the battery box 66 further comprises a power output connector 94. The power output connector 94 is coupled to the box electrical connector 80*a* as will be described with respect to FIG. 10. The power output connector 94 is configured to receive power from the battery 10 when the battery 10 is installed in the battery box 66 and to output power to a peripheral device at least when the battery box 66 is in a standalone mode. The power output connector 94 is installed on an exterior of the housing 68, such as on the front 72 thereof. The battery box 66 further comprises a power input connector 96 coupled to the box electrical connector 80*a* as will also be described with respect to FIG. 10. The power input connector 96 is configured to receive power from an external power source and to output power to the battery 10 when the battery 10 is installed in the battery box 66 at least when the battery box 66 is in an AC or DC charging mode. The power input connector 96 is also installed on an exterior of the housing 68, such as on the front 72 thereof.

Figure 10:
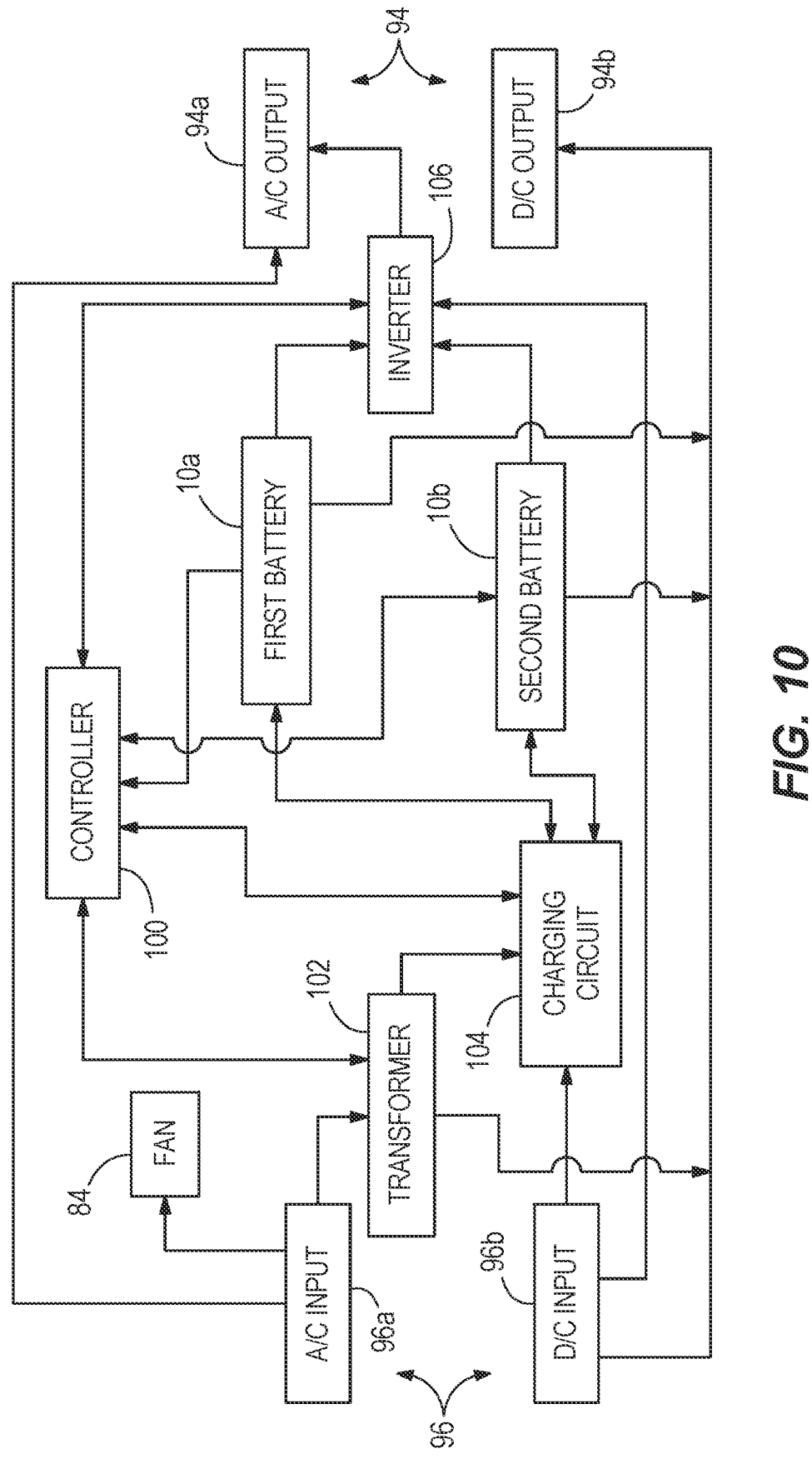
FIG. 10 is a schematic of the electrical components in the battery box.

FIG. 10 is a schematic of the battery box 66 of FIGS. 6-9. The battery box 66 includes the power output connector 94, which may include an AC power output connector 94*a* and/or a DC power output connector 94*b*. The battery box 66 also includes the power input connector 96, which may include an AC power input connector 96*a* and/or a DC power input connector 96*b*. The battery box 66 also includes a controller 100, a transformer 102, a charging circuit 104, and an inverter 106. These electrical components may be housed within the open space between the fan 84 and the interior wall 92 of the battery box 66, under the ledge 76.

The power input connector 96 receives power from the AC power input connector 96*a* and/or the DC power input connector 96*b*, based on which external power source is available, for the battery box 66 to distribute the received power. The AC power input connector 96*a* receives a female end of an AC cord, the other end of which is selectively coupled to, for example, a conventional AC outlet (such as a shore power outlet 98 on a dock, FIG. 6) to provide power to the battery box 66. The DC power input connector 96*b* connects to an external DC power source such as, for example, an external battery, a vehicle DC socket, a vehicle battery, and/or a solar charging array. The power inputs to the power input connector 96 provide power to the box electrical connectors 80*a*, 80*b* and/or to the power output connector 94. In the illustrated embodiment, the power input connector 96 is connected directly to the power output connector 94. For example, the AC power input connector 96*a* is directly connected to the AC power output connector 94*a* to provide AC power, and the DC power input connector 96*b* is directly connected to the DC power output connector 94*b* to provide DC power. In some embodiments, the power input connector 96 and the power output connector 94 may be coupled via a filtering, buffering, and/or conditioning stage. For example, the DC power input connector 96*b* may be coupled to the DC power output connector 94*b* through a DC-to-DC converter to provide a required voltage output. Although not shown, protection circuitry may be included to prevent AC power provided to AC power output connector 94*a* from other sources (e.g., inverter 106) from causing terminals of the AC power input connector 96*a* to conduct power (e.g., be "hot").

The transformer 102 is electrically connected to the AC power input connector 96*a*, the DC power output connector 94*b*, the charging circuit 104, and the controller 100. The transformer 102 receives AC power from the AC power input connector 96*a* and converts the AC power to DC power at one or more levels (e.g., 12V, 24V, etc.). The transformer 102 sends a control signal to the controller 100 to indicate that power is provided through the AC power input connector 96*a*. The transformer 102 also provides the DC power to the charging circuit 104 to charge first and second batteries 10*a*, 10*b* when the battery ports 22 of the first and second batteries 10*a*, 10*b* are connected to the battery box 66 via the box connector ports 78*a*, 78*b*. In other embodiments, the battery box 66 includes a first charging circuit for the first battery 10*a* and a separate charging circuit for the second battery 10*b*. If only one battery 10*a* or 10*b* is connected to a respective box connector port 78*a* or 78*b*, only that battery 10*a* or 10*b* is charged. In some examples, a battery 10*a* or 10*b* is charged only if the state of charge of the battery is below a predetermined voltage threshold. The transformer 102 also provides the DC power to the DC power output connector 94*b* to provide power to a peripheral device.

The DC power input connector 96*b* is connected to the DC power output connector 94*b*, the inverter 106, the charging circuit 104, and the controller 100. When an external DC power source is present and connected, the DC power input connector 96*b* sends a control signal to the controller 100 to indicate that power is provided through the DC power input connector 96*b*. The DC power input connector 96*b* transfers the DC power to the charging circuit 104 to charge the first and/or second battery 10*a* and/or 10*b*, depending on which battery 10*a* and/or 10*b* is connected to a respective box connector port 78a and/or 78b. The DC power input connector 96b also transfers DC power to the DC power output connector 94b to provide power for a peripheral device. The DC power input connector 96b is also electrically connected to the inverter 106. Although not shown, one or more DC-to-DC converters may be provided to receive and step down or up the DC input voltage to a level appropriate for the component (e.g., charging circuit 104, peripheral device) receiving the DC input voltage.

The inverter 106 is connected to the DC power input connector 96b, the batteries 10a, 10b (when installed), the AC power output connector 94a, and the controller 100. The inverter 106 includes a DC input (e.g., from the DC power input connector 96b and/or the battery 10a and/or 10b), inverter circuitry that inverts the DC power from the DC source to AC power, and an AC output coupled to the AC power output connector 94a to provide the AC power. The inverter circuitry includes, for instance, power switching elements selectively enabled by the controller 100 to transform DC power to AC power. The inverter 106 transfers the AC power to the AC power output connector 94a to provide power to an AC-powered peripheral device. The inverter 106 is also connected to the controller 100 to receive instructions from the controller 100.

The charging circuit 104 is electrically connected to the controller 100, the transformer 102, the DC power input connector 96b, and the batteries 10a and/or 10b (when installed). The charging circuit 104 controls the charging scheme for the batteries 10a, 10b. In some embodiments, the charging circuit 104 varies a charging current based on the temperature of the batteries 10a, 10b, the state of charge of the batteries 10a, 10b, the amount of time the batteries 10a, 10b have been charging, and other factors. The charging circuit 104 receives DC power from one of the AC power input connector 96a (via the transformer 102) and the DC power input connector 96b. The charging circuit 104 then controls the charging current provided to the batteries 10a, 10b. The charging circuit 104 sends and receives information regarding the charging scheme for the batteries 10a, 10b to and from the controller 100. For example, the charging circuit 104 may communicate to the controller 100 information about the present charging current used to charge the batteries 10a and/or 10b and/or the present temperature of the batteries 10a and/or 10b. In some embodiments, the batteries 10a and/or 10b include the charging circuit needed to charge the batteries 10a and/or 10b. In such embodiments, the batteries 10a and/or 10b may be connected to the controller 100 and directly with a DC power source such as, for example, the transformer 102 and/or the DC power input connector 96b.

The controller 100 is electrically connected to the transformer 102, the inverter 106, and the charging circuit 104 and to the batteries 10a and/or 10b through the respective box connector ports 78a and/or 78b. The controller 100 receives indication signals from the transformer 102 and from the DC power input connector 96b indicating that power is received through one of the transformer 102 and the DC power input connector 96b. In some instances, the controller 100 is also operable to control the transformer 102 and/or the DC power input connector 96b to control power conversion and/or power output levels. The controller 100 also receives and sends control signals to the inverter 106. In some embodiments, the controller 100 sends control signals to the charging circuit 104 to start or stop charging the batteries 10a and/or 10b, such as in response to closing or opening of a switch (not shown). If multiple power inputs are connected and operable to provide power to the battery box 66, the controller 100 is operable to select one power input for supplying power according to a predetermined priority schedule. Alternatively, additional circuitry may be provided so that the battery box 66 can use multiple power sources simultaneously. The controller 100 includes a processor and memory storing software executed by the processor to effect the functionality of the controller 100 described herein.

The power output connector 94 includes an AC power output connector 94a and/or a DC power output connector 94b. The DC power output connector 94b receives DC power from the transformer 102, the DC power input connector 96b, and/or the batteries 10a and/or 10b, based on which power input is available to provide DC power. The DC power output connector 94b is configured to receive and output DC power from one or both of the batteries 10a and/or 10b, for example, when the transformer 102 and the DC power input connector 96b are not receiving power from an external power source. The DC power output connector 94b may provide any desired voltage output and can be, for example, in the shape of a cigarette lighter, a Universal Serial Bus (USB) port, a coaxial power plug, or a 2-, 3-, or 4-prong plug. The AC power output connector 94a includes two AC output connectors (e.g., AC plugs or plug receptacles). The AC power output connector 94a is coupled to the AC power input connector 96a and to the inverter 106. The AC power output connector 94a receives AC power from one of the AC power input connector 96a and the inverter 106 based on which power input is available to provide AC power. The AC power output connector 94a is configured to receive and output AC power from one or both of the batteries 10a and/or 10b via the inverter 106, for example, when the AC power input connector 96a is not receiving power from an external power source. The AC power output connector 94a provides AC power to an AC-powered peripheral device.

Thus, a peripheral device can connect to the battery box 66 through the DC power output connector 94b or the AC power output connector 94a. The battery box 66 can then provide AC or DC power to the peripheral device for powering the peripheral device. The battery box 66 may also include a power switch (not shown) with an ON position and an OFF position to enable and disable, respectively, the battery box 66.

The battery box 66 operates in an AC mode, a DC mode, and a standalone mode. The battery box 66 is operable to charge the batteries 10a and/or 10b in the AC mode and the DC mode. The battery box 66 is operable to supply power to a peripheral device in the AC mode, the DC mode, and the standalone mode. In the AC mode, the battery box 66 receives AC power from the AC power input connector 96a. The battery box 66 is then operable to forward the received AC power to the AC power output connector 94a to power a coupled AC-powered peripheral device. The battery box 66 is also operable to rectify the received AC input power using the transformer 102. The resulting DC power is provided to the charging circuit 104 to charge the batteries 10a and/or 10b and/or to power a DC-powered peripheral device, if present, via the DC power output connector 94b.

In the DC mode, the battery box 66 receives power from an external DC power source through the DC power input connector 96b. The DC power input connector 96b provides power to a DC-powered peripheral device via the DC power output connector 94b. Additionally, the DC input power is received by the inverter 106, which inverts the power to provide AC power to AC-powered devices, if present, via the AC power output connector 94a. Furthermore, in the DC mode, power from the DC power input connector 96*b* is provided to the charging circuit 104 to charge the batteries 10*a* and/or 10*b*, if present.

In the standalone mode, the battery box 66 is not connected to an AC or DC external power source via AC power input connector 96*a* or DC power input connector 96*b*, respectively. Accordingly, the batteries 10*a* and/or 10*b* provide DC power to the inverter 106, which is inverted and provided to an AC peripheral device coupled to the AC power output connector 94*a*, and/or provide DC power to a DC peripheral device coupled to the DC power output connector 94*b*. Thus, the battery box 66 is a power supply for both AC and DC peripheral devices. The batteries 10*a*, 10*b* can be connected in series or in parallel with the power output connector 94. For example, a series connection with the power output connector 94 may be desired if the voltage of both batteries 10*a* and 10*b* is required to power a single peripheral device. A parallel connection may be desired if the voltage of only one battery 10*a* or 10*b* is required to power the peripheral device, and a switch (which may be physically manipulated by a user or electronically controlled by the controller 100) can switch from supplying power from a depleted battery to the power output connector 94 to instead supplying power from a charged battery to the power output connector 94. This may extend the use of the peripheral device in the event that input power for charging is not readily available. If the switch is electronically controlled, the controller 100 may switch from supplying power from a first battery 10*a* to the power output connector 94 to supplying power from the second battery 10*b* to the power output connector 94 in response to sensing that a voltage potential of the first battery 10*a* is below a predetermined threshold. In still other examples, the first battery 10*a* can be used to power a first peripheral device and the second battery 10*b* can be used to power a second peripheral device. For example, power from the first battery 10*a* can be provided to the AC power output connector 94*a* via the inverter 106, while power from the second battery 10*b* can be provided to the DC power output connector 94*b*. In other examples, two or more AC power output connectors are provided and/or two or more DC power output connectors are provided, and both the first and second batteries 10*a* and 10*b* can provide power to the two or more AC power output connectors, or both the first and second batteries 10*a* and 10*b* can provide power to the two or more DC power output connectors.

The fan 84 will typically be used while the battery box 66 is charging the batteries 10*a* and/or 10*b*, which creates heat. Thus, the fan 84 may be powered by an external power source, such as via the AC power input connector 96*a*. In other examples, the fan 84 may be powered via the DC power input connector 96*b*.

In some instances, a first battery box is configured for standalone use on a marine vessel 46 or elsewhere, which first battery box is not configured to charge the batteries but only to output power to a peripheral device. A second battery box may be provided solely for charging the batteries using AC or DC power, but may not be able to output power to a peripheral device.

For purposes of transferring the batteries from a standalone power supply battery box to a standalone charging battery box, the batteries are removable from the battery box. For example, by pulling the batteries 10 upwardly using their respective handles 28, the batteries 10 are removable from the battery box 66. The slots 30 on the side surfaces 14 of the battery 10 slide up the tracks 82*a* or 82*b* in the battery box 66 until the battery 10 is fully removed from the housing 68. The battery 10 can then be moved elsewhere for charging, storage, or another use.

Thus, the present disclosure is of a battery box 66 for installation on a marine vessel 46. The battery box 66 comprises a housing 68 configured to be mounted to the marine vessel 46, such as on the deck thereof. Conventional fasteners can be used to mount the battery box 66 to the deck of the marine vessel 46. The housing 68 defines an interior 70 of the battery box 66 and a ledge 76 projects into the interior 70 of the battery box 66. A box electrical connector 80*a* is installed on the ledge 76. A power output connector 94 is coupled to the box electrical connector 80*a*, 80*b*. In one example, the power output connector 94 is installed on an exterior of the housing 68 for easy access. The interior 70 of the battery box 66 is configured to receive a battery 10 therein. The battery 10 has a projecting portion 20 sized and shaped to abut the ledge 76 when the battery 10 is installed in the battery box 66. A battery electrical connector 24 on the projecting portion 20 of the battery 10 is configured to mate with the box electrical connector 80*a* upon installation of the battery 10 in the battery box 66. The power output connector 94 is configured to receive power from the battery 10 when the battery 10 is installed in the battery box 66 and to output power to a peripheral device on the marine vessel 46. In one example, the peripheral device is a trolling motor 48.

An additional box electrical connector 80*b* may be installed on the ledge 76. The interior 70 of the battery box 66 may be configured to receive the battery 10 and an additional battery 10 simultaneously. A battery electrical connector 24 on a projecting portion 20 of the additional battery 10 is configured to mate with the additional box electrical connector 80*b* upon installation of the additional battery 10 in the battery box 66.

The battery box 66 may further include a slot or track 82*a* in the interior 70 of the battery box 66, the slot or track 82*a* being configured to mate with a corresponding track or slot 30 on the battery 10 to guide installation of the battery 10 within the battery box 66. The battery 10 is also removable from the battery box 66.

A power input connector 96 may be coupled to the box electrical connector 80*a*. The power input connector 96 is configured to receive power from an external power source (e.g., shore power outlet 98, FIG. 6) and to output power to the battery 10 when the battery 10 is installed in the battery box 66. The power input connector 96 is installed on an exterior of the housing 68 for easy access.

As noted, while the battery 10 is charging, it may be necessary to cool the battery 10. Thus, the battery box 66 further comprises a fan 84 configured to provide air from an area surrounding the battery box 66 to the interior 70 of the battery box 66. The fan 84 is installed on a wall 86 of the housing 68 below the ledge 76.

Although the battery box 66 is shown and described for use with a trolling motor 48 on a marine vessel 46, the battery box 66 can be used to power other peripheral devices. For instance, the battery box 66 can be used to power a bilge pump, lights, or other peripheral devices on the marine vessel 46, in which case two or more AC power output connectors 94*a* and two or more DC power output connectors 94*b* may be provided for connection to the peripheral devices, or a downstream splitter may be used. In other examples, the battery box 66 can be installed in a home basement and used as a backup sump pump power supply, in a garage to power tools, or in a recreational vehicle or ice fishing shanty to power devices therein. This allows the battery 10 to be used year-round, which may be advantageous especially in colder climates when the battery 10 may otherwise not be used when it is too cold for boating. Having an indoor area in which a second battery box is provided for use of the batteries with a second peripheral device may prevent a situation in which the batteries are inadvertently left on the marine vessel 46 and freeze. Further, the batteries can be moved from one location to another, with each location including a separate battery box pre-connected to a peripheral device. This maximizes the use of the batteries.

In the present description, certain terms have been used for brevity, clarity, and understanding. No unnecessary limitations are to be implied therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims.

What is claimed is:

1. A battery box comprising:
a housing defining an interior of the battery box;
a ledge projecting into the interior of the battery box and defining an interior wall;
tracks formed on the interior wall and projecting into the interior of the battery box and extending downwardly from the ledge; and
a box electrical connector installed on the ledge;
wherein the interior of the battery box is configured to receive a battery therein, the battery having a projecting portion sized and shaped to abut the ledge when the battery is installed in the battery box;
wherein a battery electrical connector on the projecting portion of the battery is configured to mate with the box electrical connector upon installation of the battery in the battery box; and
wherein slots on the battery are configured to mate with the tracks formed on the interior wall of the battery box to guide installation of the battery within the battery box.

2. The battery box of claim 1, further comprising a fan configured to provide air from an area surrounding the battery box to the interior of the battery box.

3. The battery box of claim 2, wherein the fan is installed on a wall of the housing below the ledge.

4. The battery box of claim 1, further comprising a power output connector coupled to the box electrical connector, the power output connector configured to receive power from the battery when the battery is installed in the battery box and to output power to a peripheral device.

5. The battery box of claim 4, wherein the power output connector is installed on an exterior of the housing.

6. The battery box of claim 1, further comprising a power input connector coupled to the box electrical connector, the power input connector configured to receive power from an external power source and to output power to the battery when the battery is installed in the battery box.

7. The battery box of claim 6, wherein the power input connector is installed on an exterior of the housing.

8. The battery box of claim 1, further comprising an additional box electrical connector installed on the ledge;
wherein the interior of the battery box is configured to receive the battery and an additional battery simultaneously; and
wherein a battery electrical connector on a projecting portion of the additional battery is configured to mate with the additional box electrical connector upon installation of the additional battery in the battery box.

9. The battery box of claim 1, wherein the battery is removable from the battery box.

10. A battery box for installation on a marine vessel, the battery box comprising:
a housing configured to be mounted to the marine vessel, the housing defining an interior of the battery box;
a ledge projecting into the interior of the battery box;
a box electrical connector installed on the ledge;
a power output connector coupled to the box electrical connector; and
a power input connector installed on an exterior of the battery box and electrically coupled to the box electrical connector;
wherein the interior of the battery box is configured to receive a battery therein, the battery having a projecting portion sized and shaped to abut the ledge when the battery is installed in the battery box;
wherein a battery electrical connector on the projecting portion of the battery is configured to mate with the box electrical connector upon installation of the battery in the battery box;
wherein the power output connector is configured to receive power from the battery when the battery is installed in the battery box and to output power to a peripheral device on the marine vessel; and
wherein the power input connector is configured to receive power from an external power source and to output power to the battery when the battery is installed in the battery box.

11. The battery box of claim 10, further comprising a fan configured to provide air from an area surrounding the battery box to the interior of the battery box.

12. The battery box of claim 11, wherein the fan is installed on a wall of the housing below the ledge.

13. The battery box of claim 10, further comprising an additional box electrical connector installed on the ledge;
wherein the interior of the battery box is configured to receive the battery and an additional battery simultaneously; and
wherein a battery electrical connector on a projecting portion of the additional battery is configured to mate with the additional box electrical connector upon installation of the additional battery in the battery box.

14. The battery box of claim 10, wherein the battery is removable from the battery box.

15. The battery box of claim 10, further comprising a slot or track in the interior of the battery box, the slot or track being configured to mate with a corresponding track or slot on the battery to guide installation of the battery within the battery box.

16. The battery box of claim 10, wherein the power output connector is installed on the exterior of the housing.

17. The battery box of claim 10, wherein the peripheral device is a trolling motor.

18. The battery box of claim 10, wherein the battery is configured to receive power from the external power source via the battery box.

19. The battery box of claim 1, wherein the housing defines interior sidewalls and wherein a pair of additional tracks are formed on the interior sidewalls adjacent to the tracks formed on the interior wall for matingly engaging with corresponding slots on the battery.

* * * * *